United States Patent Office 3,131,073
Patented Apr. 28, 1964

3,131,073
CERAMIC MATERIAL AND METHOD OF
PREPARATION
Roger A. Long, San Diego, Calif., assignor to Telecomputing Corporation, a corporation of California
No Drawing. Filed Oct. 10, 1960, Ser. No. 61,353
25 Claims. (Cl. 106—39)

The present invention relates to improvements in ceramic material for high temperature applications, and the method of preparation thereof, and more particularly relates to the composition and preparation of a ceramic material which includes a refractory material as a filler, and a binder material comprising a eutectic of a refractory oxide and a refractory pyrophosphate.

Heretofore, high temperature ceramic materials have been undesirably brittle and therefore not suited to many applications requiring appreciable structural integrity. With the advent of higher speeds in aircraft and missiles, the need for a strong, high temperature resistant material has become critical.

According to the present invention, a ceramic material is provided which is capable of withstanding very high temperatures, and which is characterized by excellent flexural and impact strength, both at room temperature and at elevated temperatures. In addition, moisture absorption is very low, and the material is relatively easy to prepare and fabricate into laminated and molded structures, utilizing either cold press and sintering, or hot pressing, or melt and cast techniques.

The ceramic material of the present invention employs a compound broadly referred to as a metal pyrophosphate. The atomic bonding structure of this type of compound imparts great strength to the ceramic material, and such compounds are desirably characterized by a predetermined melting point.

Suitable refractory oxides are combined in the present invention with such pyrophosphates to produce eutectics which can be processed at temperatures considerably less than the melting points of the eutectics, as by cold press and sintering and hot press molding. Since the eutectic relation is present, a refractory oxide, which preferably is the same as the oxide used to form the eutectic, can be added as a filler and no melting or attack of this filler oxide will take place at or below the melting point of the eutectic. This is an extremely important aspect of the present invention.

More particularly, it has been determined that the pyrophosphates will dissolve refractory oxides to form low melting eutectics. In the present invention it is desirable that the pyrophosphate be first combined with the proper amount of refractory oxide to form the eutectic composition. This eutectic composition is then employed as a binder material, that is, a material which can be used in lesser quantities to bind, join, "alloy" together other constituents of the final ceramic type body.

The constituents of the final ceramic body which are bound together by the eutectic composition preferably include a fibrous or flake type of refractory oxide, which oxide is preferably the same as the oxide as was used to form the eutectic composition with the pyrophosphate. This combination is subsequently cold pressed and sintered, hot pressed, or melted and cast, as desired. Because the eutectic phase was thus first formed, there will be no dissolving or degradation of the subsequently added filler, as by combination with the pyrophosphate eutectic. The pyrophosphate, being a eutectic, has combined with all of the oxide, at that temperature, with which it is capable of combining. The resulting absence of combination with or attack upon the filler preserves the fiber or flake integrity of the filler, and the finished ceramic material is consequently characterized by greatly increased structural strengths. As will be seen, the fibrous or flake type filler is, however, sufficiently wetted for good bonding with the binder, and without destroying the structural strength provided by a filler in flake or fiber form. Thus, the present method of preparation of the ceramic material preserves fiber or flake integrity by controlling eutectic formation, the conditions surrounding the addition of the filler oxide, and the temperature of sintering or the like.

High modulus fiber and flake fillers are thus very efficiently employed to produce a composite ceramic material of great strength.

Other objects and features of the present invention will become apparent from the description hereinafter made.

The pyrophosphate employed preferably comprises manganese pyrophosphate ($Mn_2P_2O_7$), but it may comprise certain pyrophosphates such as: titanium pyrophosphate ($Ti_2P_2O_7$); iron pyrophosphate ($Fe_2P_2O_2$); zirconium pyrophosphate ($ZrP_2O_7$); nickel pyrophosphate ($Ni_2P_2O_7$); and the like.

Manganese pyrophosphate is an example of a suitable pyrophosphate. Manganese pyrophosphate has a melting point of 2182 degrees F., is insoluble in water, and has a density of 3.707 g./cc. It is a brownish pink material which may be obtained by a variety of chemical processes, one simple process being the dehydration of hydrated manganese pyrophosphate ($Mn_2P_2O_7 \cdot 3H_2O$) by heating to a sufficiently high temperature to drive off the water of crystallization. Another process is the calcining of ammonium manganese phosphate ($NH_4MnPO_4$) to drive off the combined water and ammonia and force the chemical rearrangement to the pyrophosphate by the following reaction:

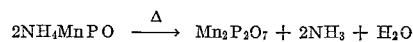
$$2NH_4MnPO \xrightarrow{\Delta} Mn_2P_2O_7 + 2NH_3 + H_2O$$

where time and temperature are the considered variables.

The process used is based on wet chemistry and the following procedure and reaction took place:

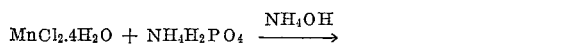
$$MnCl_2 \cdot 4H_2O + NH_4H_2PO_4 \xrightarrow{NH_4OH} NH_4MnPO_4 \cdot H_2O + 2HCl + 3H_2O$$

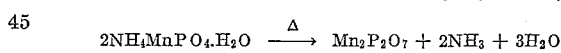
$$2NH_4MnPO_4 \cdot H_2O \xrightarrow{\Delta} Mn_2P_2O_7 + 2NH_3 + 3H_2O$$

Initially the above two salts are dissolved independently; the two solutions then mixed; and thereafter precipitated with concentrated $NH_4OH$ solution. Satisfactory purity was obtained by several distilled water washings checking the filtrate with silver nitrate solution. Next, the washed material was calcined at 1400 degrees F. for approximately one half hour.

Calcination was carried out in a fireclay crucible in air using a furnace. The calcined material was then broken into pieces approximately ½ to ¼ inches, and then ball milled until it would pass a 200 mesh screen.

Chemical porcelain and zircon crucibles were both satisfactory for melting manganese pyrophosphate, it being noted that fireclay and alumina crucibles undesirably react with the manganese pyrophosphate.

The above-prepared pyrophosphate is next blended in the proper proportions, as will be seen, with a refractory oxide or oxides which are preferably in small particle size, granular form, to produce the desired eutectic compositions. Suitable refractory oxides for this purpose include: alumina ($Al_2O_3$), obtained as —240 mesh alundum powder; zirconia ($ZrO_2$) obtained as —325 mesh, semi-stable powder; beryllia (BeO), obtained as —200 mesh; titania ($TiO_2$); chromia ($Cr_2O_3$), obtained as approximately —200 mesh; thoria ($ThO_2$), obtained as —200 mesh; hafnia ($HfO_2$), obtained as —200 mesh; and magnesia (MgO), obtained as U.S.P. heavy.

The eutectic mixtures for the pyrophosphate and the refractory oxide were then established. One method for determining this eutectic comprises pressing the blended powder at 4000 p.s.i. to 5/8 inch diameter by 1/2 inch cylindrical specimens of various percentages of each of the oxides and the pyrophosphate, placing these specimens side by side in a zircon boat, and heating them in a furnace at a pre-selected temperature for 15 minutes. Thus, the pyrophosphate is combined in specimens having 10%, 20%, 30%, etc., of the oxides. The specimens are then examined to determine which one of the specimens had just begun to flow or melt, as indicated by a slight rounding of the corners of the specimen. The percentage of oxide in the melted specimen indicates the approximate composition of the eutectic. Next, several more specimens are prepared with the percentages of oxide of each varying by, for example, 1%, and the test re-run to determine which of these just melted at the pre-selected temperature. Next, further specimens are prepared with slight variations being them, as respects the oxide composition, and the pre-selected temperature is then varied upwardly or downwardly, depending on the results of the previous tests, until the lowest temperature of melting or rounding of the corners is determined. This procedure gives an approximation of the eutectic composition, and the procedure was found to be quite reliable and accurate. Of course, other procedures for determining the eutectic composition may also be used if desired.

It was determined that for manganese pyrophosphate (—200 mesh), eutectic mixtures were formed at the following approximate temperatures for the indicated approximate percentages, by weight, of the pyrophosphate and the oxide:

| Eutectic composition | Eutectic Temperature, °F | Oxide melting point, °F |
|---|---|---|
| 7.5% $Al_2O_3$—92.5% $Mn_2P_2O_7$ | 1,987 | 3,720 |
| 11.0% $ZrO_2$—89.0% $Mn_2P_2O_7$ | 2,015 | 4,890 |
| 5.5% BeO—94.5% $Mn_2P_2O_7$ | 1,858 | 4,586 |
| 12.5% $TiO_2$—87.5% $Mn_2P_2O_7$ | 1,910 | 2,984 |
| 4.75% MgO—95.25% $Mn_2P_2O_7$ | 2,005 | 5,072 |
| 7.5% $Cr_2O_3$—92.5% $Mn_2P_2O_7$ | 1,976 | 3,614 |
| 25.0% $ThO_2$—75.0% $Mn_2P_2O_7$ | 1,906 | 5,522 |
| 16.5% $HfO_2$—83.5% $Mn_2P_2O_7$ | 1,980 | 5,090 |

Of course, the percentage of the oxide in solution will increase with higher temperatures. It is noted that the eutectics set out are characterized by a melting point low enough for relatively easy preparation and part fabrication, and are yet high enough to be able to withstand temperatures approximately 2000 degrees F. without deterioration. The above percentages and temperatures were derived by experimental techniques and are therefore only close approximations of the eutectic compositions and temperatures.

It was found that small percentages of certain materials in the pyrophosphate have a considerable effect on the euthetic compositions at the various temperatures, and, therefore, for uniformity these materials should be kept at a minimum. However, a predetermined adjustment of such materials is another means for easily adjusting the eutectic melting point, which melting point is important for the reasons above-discussed.

The most active of such materials or compounds in manganese pyrophosphate is one of the sodium phosphates, which was less than 10% by weight of the manganese pyrophosphate used in establishing the above experimental results. The presence of such sodium phosphates has the effect of lowering the eutectic melting point, and additions of between 10 and 20% by weight of $Na(PO_3)_3$ has been found to be a useful means for effectively lowering the eutectic temperature when desired.

X-ray analysis was made of a commercially available batch of manganese pyrophosphate to identify and quantitize the minor components present. The X-ray diffraction studies identified the major and minor components as $Mn_2P_2O_7$ (80%) and $Na(PO_3)_3 \cdot H_2$ (20%), respectively. The latter being the beneficial material addition even though it can also be considered as an impurity compound. Trace constituents in this batch were identified as tri-poly phosphate and sodium hypophosphite mono-hydrate, the latter constituent being highly water soluble. It was also found that a water soluble content of 5 weight percent existed, of which 1.13% was identified as $Na^+$.

These same X-ray diffraction studies showed that $Mn_2P_2O_7$ synthesized by the above described process was relatively pure. A table is set forth below to show the variations in two different batches of commercially available $Mn_2PO_7$.

| | $Na(PO_3)_3$, percent | M.P. of material, °F. | M.P. after washing, °F. | Eutectic alumina | |
|---|---|---|---|---|---|
| | | | | Percent | °F. |
| Batch #1 or #9 (Pure $Mn_2P_2O_7$) | 0 | 2,180 | 2,180 | 7.5 | 1,987 |
| Batch #2 | 10 | 1,660 | 1,885 | 2-10 | [1] 1,667 |

[1] All melted.

Manganese pyrophosphate was formed into a eutectic with the refractory oxides by blending eutectic proportions of —200 mesh manganese pyrophosphate with the oxide, which also had a fineness of —200 mesh. Blending was from four to twelve hours in a rotating glass jar containing a plurality of rubber balls.

The blended mixture is pressed in a pellet press to form bricquets, which are thereafter melted in an electric furnace in air, or in a vacuum induction furnace. The induction heating of the electric furnace in a vacuum requires no stirring because of the characteristic stirring of induction heating. Zircon and graphite crucibles were used to contain the material, and melting was effected by bringing the eutectic mixture to a temperature approximately 50 to 200° F. above the eutectic melting point, as had been previously determined.

The melted mass is immediately poured into cold water and the resulting frit is dried and then ball milled in a rubber lined porcelain ball mill for particle reduction to at least —100 mesh or finer. Other non-contaminating ball mills could be used.

Blending of this eutectic and the filler oxide was done in a porcelain ball mill using alumina media, that is, the mill was half-filled with spherical balls or cylindrical elements, and milled dry for one hour, and the mix was screened through a 100-mesh sieve. Five to six percent of water was then added to the mix for sufficient green pressed strength, and pressing was done from 4000 p.s.i. to 20,000 p.s.i.

All sintering was done by placing the pressed materials in a kiln, at the design sintering temperatures, for fifteen minutes to thirty minutes, as determined by the rapidity with which the particular material reached kiln temperature. After sintering, the materials were withdrawn from the kiln and allowed to cool in air. For combinations of materials having lower thermal shock resistance, slower heating and cooling methods were used.

Each of the ceramic materials of the present invention thus includes two basic components: (1) a refractory oxide eutectic, and (2) a filler material in granular, flake, or fiber form. Since the eutectic is present the refractory oxide serves as a true filler whose structural integrity is not reduced by any appreciable erosion by the binder at temperatures at or below the fusion point. However, it is theorized that a limited amount of controlled erosion enhances the structural properties of the end ceramic material because a better bond is thereby produced between the binder and the filler. Accordingly, sintering is preferably carried out at temperatures slightly in excess of the eutectic melting point to effect "wetting" of the filler.

Typical compositions and processing data which may be used to produce ceramic materials according to the present invention are as follows (the percentages of the ingredients being approximate and by weight), the first example being $Mn_2P_2O_7$ without any filler for purposes of comparison:

EXAMPLE I

100% $Mn_2P_2O_7$:         Sintering temperature, °F.
   Modulus of rupture, 2540 p.s.i _____ 1900
   Modulus of rupture, 1510 p.s.i _____ 2000

EXAMPLE II

Eutectic of $Al_2O_3$ and $Mn_2P_2O_7$ ____percent__ 73 to 94
Alumina ($Al_2O_3$) _____do____ 6 to 26.3
Sintering temperature _____°F____ 2000

EXAMPLE III $ZrO_2$ Flake·$ZrO_2$ Eutectic

| Specimen | Composition, percent | | Temperature, °F.[1] | $A^2$ percent |
|---|---|---|---|---|
| | Flake | Eutectic | | |
| 1 | 20 | 80 | 2,000 | 19.7 |
| 2 | 30 | 70 | 2,000 | 17.6 |
| 3 | 40 | 60 | 2,000 | 10.9 |
| 4 | 50 | 50 | 2,000 | 8.2 |
| 5 | 60 | 40 | 2,000 | 13.07 |
| 6 | 70 | 30 | 2,000 | 16.0 |
| 7 | 80 | 20 | 2,000 | 19.5 |
| 8 | 90 | 10 | 2,000 | 19.7 |

[1] All specimens at temperature for 1 hour. All specimens pressed a 1500 p.s.i.
[2] Volume loss of specimen due to sintering.

EXAMPLE IV

Zirconia ($ZrO_2$) flake _____ 60%.
Eutectic of $ZrO_2$ and $Mn_2P_2O_7$ _____ 40%.
Modulus of rupture (R.T.) _____ 10,000 p.s.i.
Modulus of rupture (800° F.) _____ 9670 p.s.i.
Modulus of rupture (1000° F.) _____ 6940 p.s.i.
Modulus of elasticity (R.T.) _____ $10 \times 10^6$ p.s.i.
Modulus of elasticity (800° F.) _____ $10 \times 10^6$ p.s.i.
Sintering temperature _____ 2000° F.

EXAMPLE V

Zirconia ($ZrO_2$) flake _____ 80%.
Eutectic of $ZrO_2$ and $Mn_2P_2O_7$ _____ 20%.
Modulus of rupture _____ 11,390 p.s.i.
Modulus of elasticity _____ $9.3 \times 10^6$ p.s.i.
Sintering temperature _____ 2000° F.

The following composition is an example of a ceramic material which includes an oxide as a part of the eutectic, but which employs a different oxide as the filler (percentages are by weights):

EXAMPLE VI

Titania ($T_1O_2$) flake _____ 70%.
Eutectic of 11% $ZrO_2$ and 89% $Mn_2P_2O_7$.30%.
Modulus of rupture (R.T.) _____ 11,400 p.s.i.
Modulus of rupture (800° F.) _____ 10,900 p.s.i.
Modulus of rupture (1000° F.) _____ 10,200 p.s.i.
Modulus of elasticity (R.T.) _____ $17.6 \times 10^6$ p.s.i.
Modulus of elasticity (800° F.) _____ $14.0 \times 10^6$ p.s.i.

The sintering temperature in this case is preferably slightly above the eutectic melting point although it could be slightly below. Another form of solid solution or compound is obtained upon sintering the above composition, the precise nature of which is unknown, but which has yielded satisfactory strength values.

It is noted that the eutectic temperatures of the eutectic compositions previously noted are all fairly close to each other. This substantial uniformity of eutectic temperatures is striking in view of the wide variation in melting points of the various oxides.

Coefficients of thermal expansion (inches per inch per degree Fahrenheit) were determined for certain of the eutectic compositions as follows:

| | R.T. to 800° F. | R.T. to 1400° F. |
|---|---|---|
| (1) 40% zirconia eutectic and 60% zirconia flake | $3.48 \times 10^{-6}$ | $3.82 \times 10^{-6}$ |
| (2) 30% zirconia eutectic and 70% titania flake | $4.32 \times 10^{-6}$ | $4.74 \times 10^{-6}$ |

This latter formulation was made into an actual part having a configuration of a nozzle insert. The part was pre-sintered at 1700° F., and a 7% shrinkage noted. This part was machined to the desired configuration with high speed carbide tipped tools, and subsequently final sintered at 2000° F., a 2% shrinkage being noted. This method of producing a part made of the material of the present invention provided a relatively easy means for machining. That is, the machining was carried out after pre-sintering, whereas such machining would be extremely difficult to accomplish after the final sintering operation, and, in fact, grinding methods would have to be used.

Actual tests have shown that the impact strength of the various ceramic materials prepared according to the present invention are characterized by high impact strength. These materials, particularly those made with titania flake, alumina flake and zirconia flake, withstood the impact of a blow by a 2½ pound hammer without cracking. Ordinary ceramic bodies of the prior art were found to shatter or crack under such a blow.

Thus, there has been provided ceramic materials according to the present invention which are characterized by a fairly low eutectic temperature which makes fabrication of the materials into various bodies a simple matter. The materials of the invention retain high strength and modulus of elasticity at high temperatures. The materials are heat resistant and have good insulating qualities. The low thermal expansion characteristics of the materials also indicate the very satisfactory thermal shock characteristics of the material. These qualities adapt the present ceramic materials to a variety of uses wherein such qualities are desirable, such as heat resistant cookware, radome bodies, brake shoe linings, and the like.

While certain preferred embodiments of the invention have been specifically disclosed, it is understood that the invention is not limited thereto as many variations will be readily apparent to those skilled in the art and the invention is to be given its broadest possible interpretation within the terms of the followings claims.

I claim:

1. A sintered article comprising a filler and a binder, said binder consisting essentially of a eutectic of a refractory oxide and a metal phyrophosphate capable of forming a eutectic mixture with said refractory oxide, said filler consisting essentially of finely divided refractory oxide, said binder being present in an amount sufficient to effectively bond said filler.

2. A sintered article comprising a filler and a binder, said binder consisting essentially of a eutectic of a refractory oxide selected from the group consisting of alumina, zirconia, beryllia, titania, magnesia, chromia, thoria, and hafnia; and a metal pyrophosphate selected from the group consisting of the pyrophosphates of manganese, titanium, iron, zirconium and nickel; said filler consisting essentially of finely divided refractory oxide, said binder being present in an amount sufficient to effectively bond said filler.

3. The article of claim 2 wherein the refractory oxide in the binder and in the filler are the same.

4. The article of claim 2 wherein the refractory oxide in said binder and in said filler are different.

5. A sintered article comprising a filler and a binder, said binder consisting essentially of a eutectic of manganese pyrophosphate and a refractory oxide selected from the group consisting of alumina, zirconia, beryllia, titania, magnesia, chromia, thoria and hafnia; said filler consisting essentially of finely divided refractory oxide, said binder being present in an amount sufficient to effectively bond said filler.

6. A sintered article comprising a filler and a binder, said binder consisting essentially of a eutectic comprising about 92.5% by weight manganese pyrophosphate and about 7.5% by weight alumina, said filler consisting essentially of finely divided refractory oxide, said binder being present in an amount sufficient to effectively bond said filler.

7. A sintered article comprising a filler and a binder, said binder consisting essentially of a eutectic comprising about 89% by weight of manganese pyrophosphate and about 11% by weight of zirconia, said filler consisting essentially of finely divided refractory oxide, said binder being present in an amount sufficient to effectively bond said filler.

8. A sintered article comprising a filler and a binder, said binder consisting essentially of a eutectic comprising about 94.5% by weight of manganese pyrophosphate and about 5.5% by weight of beryllia, said filler comprising finely divided refractory oxide, said binder being present in an amount sufficient to effectively bond said filler.

9. A sintered article comprising a filler and a binder, said binder consisting essentially of a eutectic comprising about 87.5% by weight of manganese pyrophosphate and about 12.5% by weight titania, said filler consisting essentially of finely divided refractory oxide, said binder being present in an amount sufficient to effectively bind said filler.

10. A sintered article comprising a filler and a binder, said binder consisting essentially of a eutectic comprising about 95.25% by weight manganese pyrophosphate and about 4.75% by weight magnesia, said filler consisting essentially of finely divided refractory oxide, said binder being present in an amount sufficient to effectively bind said filler.

11. A sintered article comprising a filler and a binder, said binder consisting essentially of a eutectic comprising about 92.5% by weight manganese pyrophosphate and about 7% by weight chromia, said filler consisting essentially of finely divided refractory oxide, said binder being present in an amount sufficient to effectively bond said filler.

12. A sintered article comprising a filler and a binder, said binder consisting essentially of a eutectic comprising about 75% by weight manganese pyrophosphate and about 25% by weight thoria, said filler consisting essentially of finely divided refractory oxide, said binder being present in an amount sufficient to effectively bond said filler.

13. A sintered article comprising a binder and a filler, said binder consisting essentially of a eutectic comprising about 83.5% by weight manganese pyrophosphate and about 16.5% by weight hafnia, said filler consisting essentially of finely divided refractory oxide, said binder being present in an amount sufficient to effectively bond said filler.

14. A sintered article comprising a filler and a binder, said binder consisting essentially of a eutectic comprising about 74% by weight manganese pyrophosphate and about 26% by weight alumina, said filler consisting essentially of finely divided alumina, said filler comprising about 26% by weight, based on the total weight of filler and binder.

15. A sintered article comprising a filler and a binder, said binder comprising a eutectic of manganese pyrophosphate and zirconia, said filler comprising finely divided zirconia, said filler comprising about 20 to about 90% by weight, based on the total weight of said filler and said binder.

16. A sintered article comprising a binder and a filler, said binder consisting essentially of a eutectic of manganese pyrophosphate and zirconia, said filler consisting essentially of titania, said filler comprising about 40 to about 80% by weight, based on the total weight of said binder and said filler.

17. A process comprising the steps of forming a eutectic by combining a finely divided refractory oxide and a finely divided metal pyrophosphate, said metal pyrophosphate being capable of forming a eutectic with said refractory oxide; melting said combined pyrophosphate and refractory oxide; reducing the melted material to a finely divided condition to form a finely divided binder; blending said finely divided binder with a finely divided refractory oxide filler, said binder being present in an amount sufficient to effectively bond said filler; and heating the blended material under pressure at a temperature of about the melting point of the eutectic binder.

18. A process comprising heating a composition consisting essentially of a eutectic of a refractory oxide and a metal pyrophosphate, said metal pyrophosphate being capable of forming a eutectic with said refractory oxide and said refractory oxide having a melting point higher than said metal pyrophosphate, to a temperature sufficiently high to cause substantially all of said metal pyrophosphate and said refractory oxide to melt.

19. A eutectic of a metal pyrophosphate and a refractory material having a melting point higher than said metal pyrophosphate and selected from the group consisting of the refractory oxides.

20. The process of claim 17, wherein the sintering is at a temperature slightly above the eutectic temperature to effect limited fusion of the refractory oxide by the eutectic composition.

21. The process of claim 17 wherein the pyrophosphate is selected from the group consisting of manganese, titanium, iron, zirconium, and nickel.

22. The process of claim 17 wherein the refractory oxide of the first step is selected from the group consisting of alumina, zirconia, beryllia, titania, magnesia, chromia, thoria, and hafnia.

23. The process of claim 17 wherein the refractory oxide of the filler is selected from the group consisting of alumina, zirconia, beryllia, titania, magnesia, chromia, thoria, and hafnia.

24. The process of claim 17 wherein the refractory oxide of the binder and of the filler are the same.

25. The process of claim 17 wherein the refractory oxide of the binder and of the filler are different.

26. The process of claim 17 and including the step of adding approximately 10 to 20 weight percent of Na(PO$_3$)$_3$ to the metal pyrophosphate to lower the melting point of the eutectic binder.

References Cited in the file of this patent

UNITED STATES PATENTS 2,898,216　　Bray et al. _____ Aug. 4, 1959